US012076758B2

(12) United States Patent
Glaeser et al.

(10) Patent No.: US 12,076,758 B2
(45) Date of Patent: Sep. 3, 2024

(54) LADDER CLEANING DEVICE AND METHODS

(71) Applicant: Ørsted Wind Power A/S, Fredericia (DK)

(72) Inventors: Lucas Glaeser, Gentofte (DK); Kurt Gilmour, Gentofte (DK); Klaus Baggesen Hilger, Gentofte (DK)

(73) Assignee: Ørsted Wind Power A/S (DK)

( * ) Notice: Subject to any disclaimer, the term of this patent is extended or adjusted under 35 U.S.C. 154(b) by 247 days.

(21) Appl. No.: 17/255,318

(22) PCT Filed: Jun. 18, 2019

(86) PCT No.: PCT/EP2019/065987
§ 371 (c)(1),
(2) Date: Dec. 22, 2020

(87) PCT Pub. No.: WO2020/007601
PCT Pub. Date: Jan. 9, 2020

(65) Prior Publication Data

US 2022/0266309 A1 Aug. 25, 2022

(30) Foreign Application Priority Data

Jul. 2, 2018 (EP) .................................... 18181227

(51) Int. Cl.
*B08B 1/16* (2024.01)
*B08B 1/30* (2024.01)
*E06C 7/00* (2006.01)

(52) U.S. Cl.
CPC ................ *B08B 1/165* (2024.01); *B08B 1/30* (2024.01); *E06C 7/00* (2013.01)

(58) Field of Classification Search
CPC ........... B08B 1/00; B08B 1/005; B08B 1/008; E06C 7/00
See application file for complete search history.

(56) References Cited

U.S. PATENT DOCUMENTS

| | | | | |
|---|---|---|---|---|
| 1,266,050 | A | 5/1918 | Reynolds | |
| 8,191,684 | B1 | 6/2012 | Dammann | |
| 8,950,348 | B2 * | 2/2015 | Neibauer | B63B 21/00 114/230.1 |

FOREIGN PATENT DOCUMENTS

| | | | | | |
|---|---|---|---|---|---|
| CA | 2697876 | | * | 3/2010 | |
| CA | 2697876 | A1 | * | 9/2010 | |
| CN | 204192526 | U | | 3/2015 | |
| EP | 1642655 | A1 | | 4/2006 | |
| EP | 3045652 | A1 | | 7/2016 | |
| GB | 2529220 | A | * | 2/2016 | B08B 1/002 |
| JP | 11-300289 | | | 11/1999 | |
| KR | 20-1994-0000353 | U | | 1/1994 | |
| WO | 85/01971 | A1 | | 5/1985 | |

(Continued)

*Primary Examiner* — Shay Karls
(74) *Attorney, Agent, or Firm* — Condo Roccia Koptiw LLP

(57) ABSTRACT

Devices are methods are disclosed for a ladder cleaning device. The ladder cleaning device comprises a number of rings. The rings are adapted to be arranged around rungs of a ladder. A cord passes through a hole in each of said rings. The device further comprises at least one attachment device adapted for attaching said cord to the ladder. The ladder cleaning device may be in the form of a kit of parts to allow retrofitting on the ladder.

20 Claims, 3 Drawing Sheets

(56) References Cited

FOREIGN PATENT DOCUMENTS

| | | | |
|---|---|---|---|
| WO | 88/08808 | A1 | 11/1988 |
| WO | 2015/189692 | A2 | 12/2015 |
| WO | 2017/088886 | A1 | 6/2017 |

* cited by examiner

LADDER CLEANING DEVICE AND METHODS

CROSS REFERENCE TO RELATED APPLICATIONS

This application is the National Stage Entry under 35 U.S.C. § 371 of Patent Cooperation Treaty Application No. PCT/EP2019/065987, filed Jun. 18, 2019, which claims priority from European Application No. 18181227.2, filed Jul. 2, 2018, the contents of which are hereby incorporated by reference herein in their entireties.

BACKGROUND

Access to an offshore wind turbine, or other offshore structures, is gained by climbing a ladder attached to the transition piece such as of the monopile of a wind turbine. The lower part of this ladder is submerged in water half of its life, due to the rise and fall of the tide. Due to the ladder being in and out of the water, there is a large issue with algae, sea weed and other marine growth on the ladder rungs, which in time makes it extremely slippery, causing safety issues whilst climbing the rungs at a low tide.

One current solution to this problem is cleaning the ladders with a high pressure washer at a low tide. This solves the issue in the short term but not long term, and due to the weather offshore, it is very hard to keep on top of this work on a day to day basis.

Other systems of ladder cleaning have also been proposed. WO2017/088886 discloses a propelled crawler adapted to climb a ladder, detecting the rungs and cleaning them using water jets from nozzles. EP3045652 proposes an autonomous buoyant ladder cleaning device adapted to move up and down the ladder with tide and waves and clean the ladder rungs by means of protruding brushes while doing so. None of these proposals seem to have gained any success.

Based on this prior art, it is the object to provide a system for cleaning a ladder, in particular an autonomous system for cleaning a ladder installed offshore.

SUMMARY

This invention relates to a ladder cleaning device, in particular an autonomous offshore ladder cleaning device using the movement and motion of the sea, as well as a system incorporating such a device.

According to a first aspect of the invention, this object is achieved by a ladder cleaning device, said ladder cleaning device comprising a number of rings, where the rings are adapted to be arranged around rungs of a ladder, a cord passing through a hole in each of said rings, and at least one attachment device adapted for attaching said cord to the ladder.

According to a second aspect of the invention this object is achieved by a kit of parts for providing a ladder cleaning device, said kit of parts comprising a cord, at least one attachment means for attaching the cord to a ladder, and a number of ring segments.

According to a third aspect of the invention, this object is achieved by a cleaning system comprising a ladder, and a ladder cleaning device according to the first or second aspect.

According to a first preferred embodiment, the attachment device is associated with a stringer of the ladder. Associating the attachment means with one of the normally two stringers of a ladder, e.g. by mounting it directly thereon or in close proximity thereto, such as on a rung, allows the cleaning device to easily be cleared away by a person to climb the ladder.

According to another preferred embodiment, the attachment device is adapted to attach the cord to a rung of the ladder. The rungs of the ladder typically have smaller cross-sections than the rest of the ladder and the attachment device may be made small and handy.

Furthermore, when, according to a further preferred embodiment, the ladder cleaning device of the invention comprises two attachment devices arranged at a predetermined distance from each other along said cord, it becomes intuitive to place the attachment devices with the correct spacing, as they may simply be attached to the first vacant rungs after those on which the rings are arranged.

This is in particular the case, when according to another preferred embodiment, the predetermined distance is so adapted to the number of rings and the distance between the rungs around which the rings are to be arranged that the rings may move horizontally along the rungs. Allowing the rings to move horizontally allows the rings to move along the rungs with the waves and currents so as to clean the entire length of the rungs.

According to yet another preferred embodiment, the hole through which the cord passes is the central hole of a ring. This hole is comparatively large and allows the cord to move relatively freely. This for one allows all rings to move along the length of the rung on which they are arranged. For the other it allows the rings all to be easily drawn into line above each other by a person pulling somewhere along the cord. The rings and the cord may thus easily be pulled aside to clear the way when a person needs to climb the ladder.

According to a further preferred embodiment, the cord is, as seen in a direction upwardly from the bottom, threaded through the rings in a direction away from the stringer associated with the attachment means. This is in particular the case when, according to a further preferred embodiment, the rings comprise a scraper blade arranged on the exit side of the cord through the rings. Moreover, when pulling the cord to clear the way for passage of the ladder, the pull will tilt the rings away from the scraper side, and thus make it easier to pull the rings towards the stringer. On the other hand, when left on their own the rings will experience less friction when sliding to the scraper side due to the tilt causing loss of contact. This, in turn, ensures that the rings move away from the stringer to which they have been pulled and back onto middle of the rung where cleaning is needed most, because that is where persons climbing the ladder tread. Consequently, the cleaning effect is greatly improved where it is needed the most.

According to yet a further embodiment, the hole is adapted to the cross-sectional shape of the rung on which it is to be arranged. This allows the rings to follow and at least engage the cross-sectional shape of the rung so as to ensure cleaning of a large part of the surface thereof.

According to another preferred embodiment, each ring comprises at least two segments, adapted to be assembled around a rung to form said ring. The rings may thus be easily assembled around the rungs and the cord.

According to yet another preferred embodiment, the at least two segments comprises mutually adapted engagement means so as to be assembled without the use of tools. This facilitates the offshore installation which may take place under difficult circumstances, leaving possibly only one hand free to do the installation.

According to yet a further preferred embodiment, the rings have a lower density than sea water. They will then have a buoyancy forcing them towards the underside of the rungs when submerged, thus allowing them to clean the underside of the rungs, when submerged as well as the upper side of the rungs on which the hang when not submerged. Preferably the rings have internal buoyancy chambers in order to achieve this.

BRIEF DESCRIPTION OF THE DRAWINGS

The invention will now be described in greater detail based on nonlimiting exemplary embodiments and the drawings on which.

DETAILED DESCRIPTION

Figure 1B:
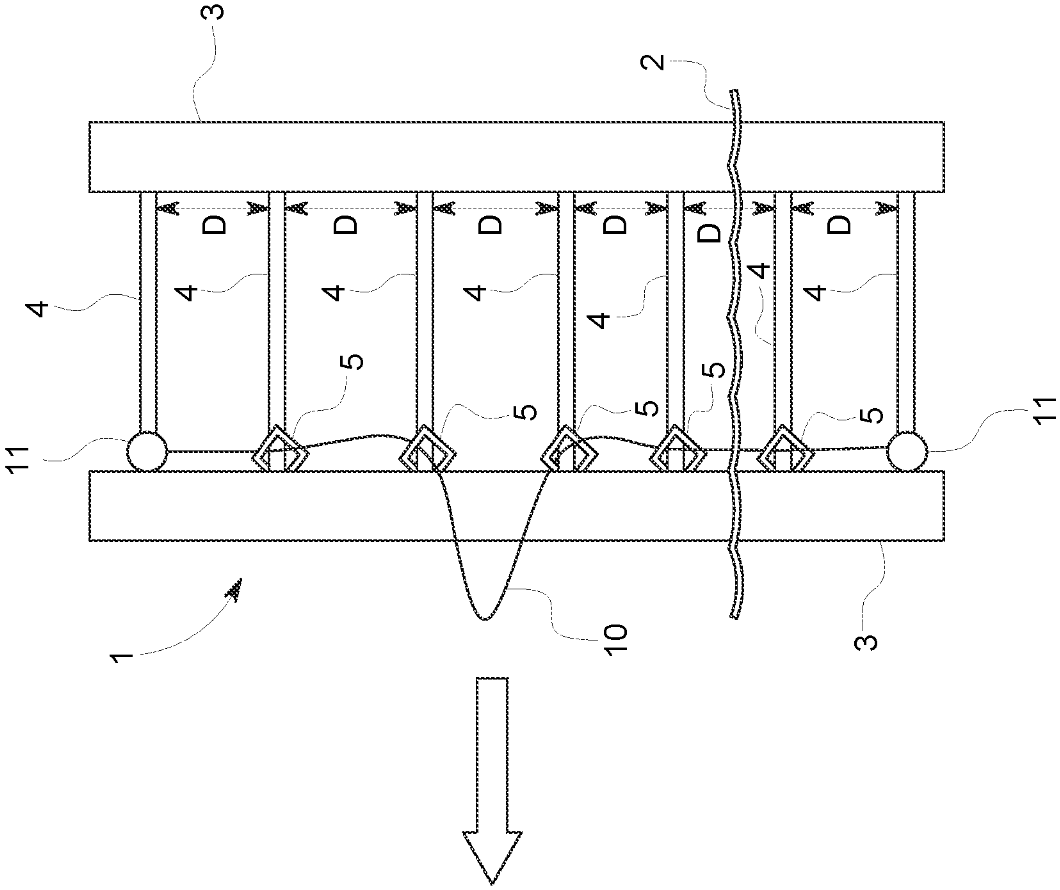
FIG. 1*b* shows the cleaning system with the cleaning device drawn aside to allow passage of a person on the ladder.
Figure 1A:
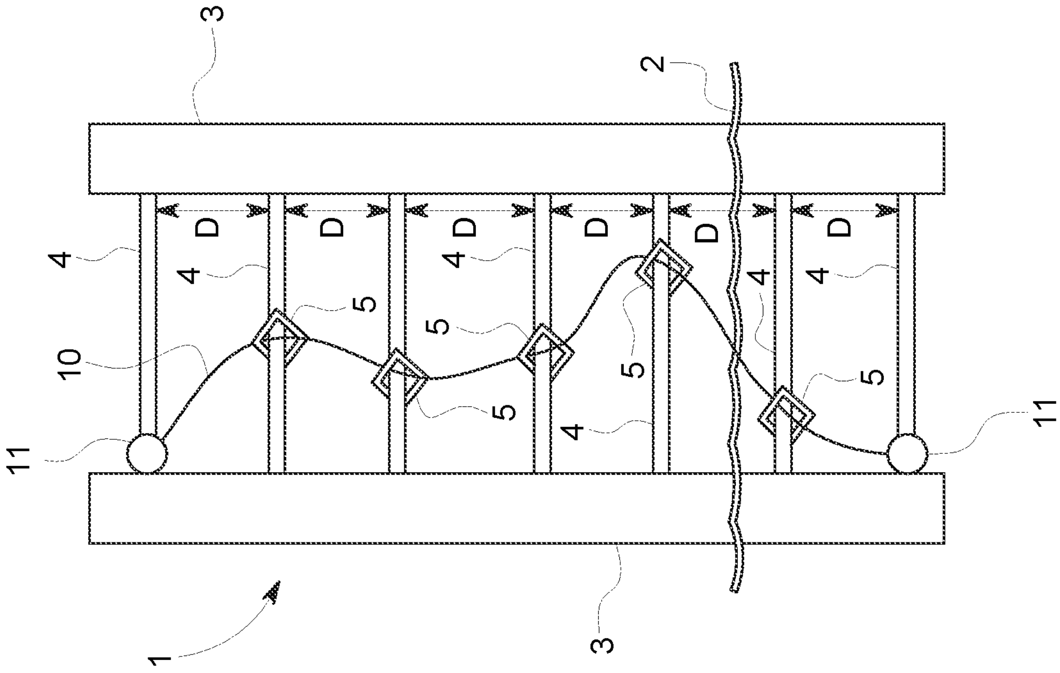
FIG. 1*a* shows a cleaning system comprising a cleaning device according to the invention in the operating position.
Figure 3:
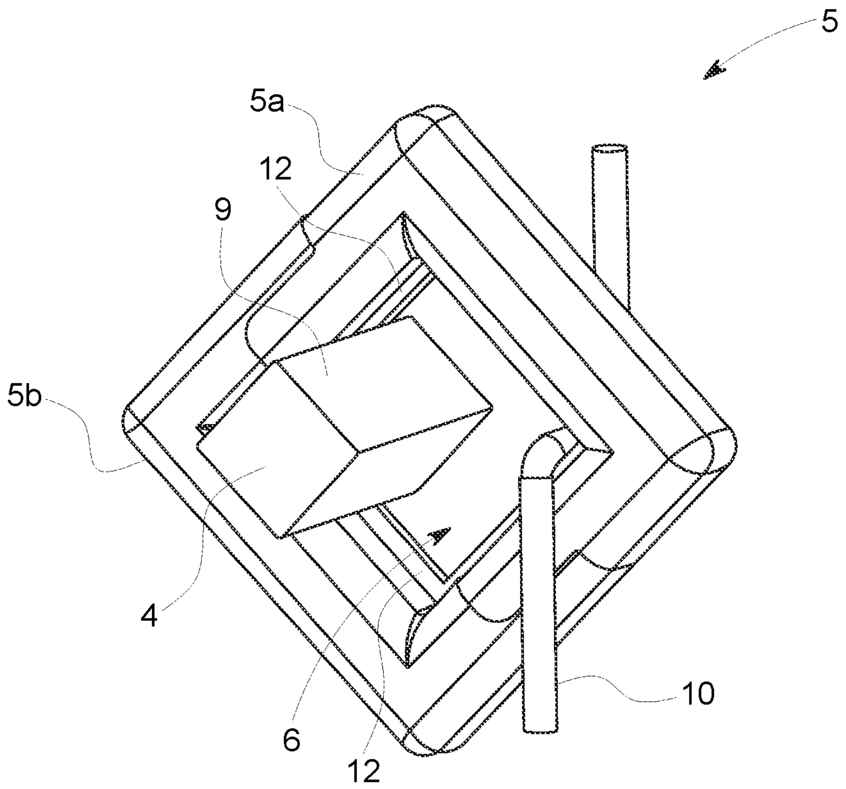

Turning first to FIG. 1*a* cleaning system according to the invention is shown. The system comprises a ladder 1 which is partially submerged below the sea surface 2. The ladder comprises two stringers 3 and a number of rungs 4 connecting the stringers 3. Since the level of the sea surface 2 normally changes with waves, tides, currents, atmospheric pressure etc., there is a zone where rungs 4 are sometimes submerged and prone to growth of e.g. algae while at other times they are out of the water and must serve their purpose as steps for persons climbing the ladder. Permanently submerged rungs below that, if any, will normally not be used, and rungs above that will generally be dry and little prone to overgrowth. The zone in use and prone to growth is in the following referred to as the critical zone, as overgrown rungs will normally be slippery and pose a hazard for persons using the ladder, e.g. for offshore transfer. The same will of course also apply to other partially submerged ladders, such as safety ladders 1 in harbours and the like, and the system of the invention is also applicable in such places and not only offshore. Around each of the rungs 4 in the critical zone a ring 5 is arranged. As can be seen, the ring 5 is not necessarily circular or toroidal but may, as best seen in FIG. 3, be generally polygonal, in particular square, albeit with rounded corners, and have a likewise generally square cross-section of the body forming the ring 5. The central hole 6 of the ring is likewise preferably square with rounded inside corners 7. As can be seen from FIGS. 3, 4*a* and 4*b*, the shape of the central hole 6 and the radius of the rounded corners is adapted to the rounded corners of the rungs 4, i.e. the cross-sectional shape of the rungs 4, so that the inner surfaces of the ring 5 may lie flush with the surfaces of the rung to be cleaned. If the rungs 4 were circular in cross-section and not square as shown, the radius of the corners 7 would correspond to the radius of the cross-section of the rungs 4.

Thus when due to wind, waves, currents etc. the rings 5 move back and forth along the rungs 4, parts of the inner surface 8 including some of the corners of the ring 5 will slide along the matching surface 9 of the rung 4, and scrape off or inhibit beginning growth, thus keeping the rungs 4 clean and safe. In order to maximize the scraping the rings 5 may have a scraper, such as a scraper blade 12. The scraper blade 12 in one embodiment is a rubber washer or ring generally matching the shape of the ring 5 itself but with a smaller central hole than the central hole 6 of the ring 5, so that protrudes inwardly over the ring 5. The scraper blade 12 is in that case preferably made of a rubber material. Preferably, there is only one scraper blade 12 affixed to one side of the ring 5 as illustrated in FIG. 3. Thus, when pulling the cord 10 to clear the way for passage of the ladder 1, the pull will tilt the rings away from the scraper side, and thus make it easier to pull the rings 5 towards the stringer 3 without experiencing the increased friction from the rubber. On the other hand, when left on their own the rings 5 will experience less friction when sliding to the scraper side due to the tilt causing loss of contact. This, in turn, ensures that the rings 5 move quickly away from the stringer 3 to which they have been pulled and back onto middle of the rung 4 where cleaning is needed most, because that is where persons climbing the ladder 1 tread.

In another embodiment the scraper blade 12 may be made from a hard plastic material, e.g. the same material as the rings 5 are made of. This, in turn, allows the scraper blade 12 to be integrally formed with the ring 5 in the same manufacturing process, e.g. injection moulding. The scraper blade 12 may, however, also in this case be a separate part attached to the ring 5.

As an alternative to the scraper blade 12 protruding inwardly over the ring 5, a scraper in the form of a comb or brush like structure could be used. That is to say, a plurality of rigid elongated protrusions protruding inwardly, the protrusions e.g. being arranged in a line as the teeth of a comb, or covering an area like the bristles of a brush. These protrusions could be made of the same material as the ring 5, and preferably moulded integrally therewith, but harder materials, such as metal, or softer material, such as rubber, could also be envisaged. Evidently, any harder material should not be so hard that it damages the protective coating on the rungs 4.

Figure 4A:
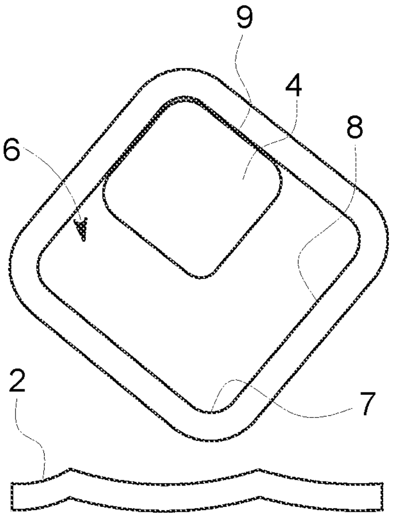
FIG. 4*a* shows a ring of the cleaning device hanging on a rung out of the water.
Figure 4B:
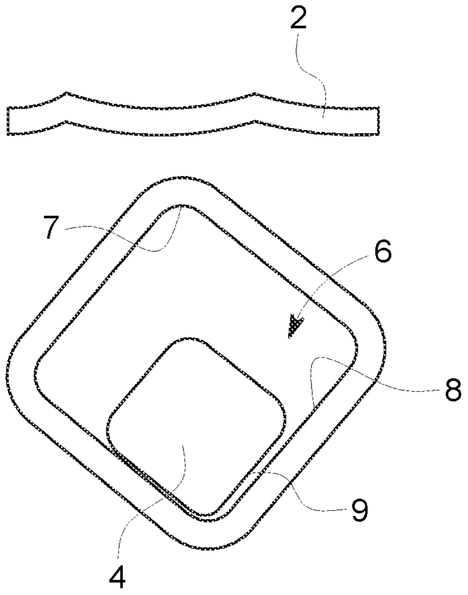
FIG. 4*b* shows the ring of FIG. 4*a* held down by the rung in a submerged position.

Preferably, as can be seen from comparison between FIGS. 4*a* and 4*b* the rings 5 have a density lower than sea water so that when submerged, their buoyancy will keep some of the rounded corners 7 and parts of the inner surfaces 8 in engagement with the surfaces 9 of the underside of the rungs 4, allowing these parts to be cleaned. Conversely, when they are not submerged the rings 5 will hang suspended on the rungs 4, allowing the upper surfaces 9 of the rungs 4 to be cleaned. The desired density can be achieved by suitable material selection or by incorporating buoyancy chambers in the rings 5.

Turning now to FIGS. 1*a* and 1*b* it can be seen that a cord 10 is passed through the rings 5, preferably through the central hole 6 thereof. The cord 10 is attached to the ladder 1 by means of at least one attachment device 11. The attachment device 11 may be fitted on the cord 10 prior to the installation of the system at sea, e.g. during manufacture, or it may be fitted in-situ. Preferably, there are two attachment devices 11 fitted on the cord 10 in manufacture, thereby defining a predetermined length of cord 10 between them. The distance defined between the attachment devices 11 along the cord 10 is adapted to the number of rings 5 and the distances D between the rungs 4 around which the rings 5 are to be arranged and to the attachment points of the attachments devices 11 on the ladder 1, so that the rings 5 may move horizontally along the rungs 4, preferably along the entire length of the rung 4 on which they are arranged. The attachment devices 11 are preferably also adapted to be attached to the rungs 4, so that it becomes intuitive where to mount them and not run the risk that the cord 10 is not loose enough to allow the horizontal movement of the rings 5. This will normally be on the first rung 4 above the ones on which rings 5 are arranged and the first rung 4 below them. It is of course not excluded that the attachment devices 11 attach the cords 10 to the stringers. It is, however, currently preferred to use a simple clamp as attachment device 11 clamping on to a rung 4. This will make a smaller and less complicated attachment device 11 than if it were to be adapted to be attached to e.g. a stringer 3.

The cord 10 in practice forms a loose linking of the rings 5. This link serves two different purposes which will be understood from FIGS. 1*a* and 1*b*. Turning first to FIG. 1*a*, it can be it can be seen that when one ring 5, say the one most exposed to wind waves and currents, moves under the influence thereof it will pull sideways on the cord 10, which will then transmit forces to the other rings 5 thereby moving them too, so that not only the exposed ring 5 performs cleaning sweeps along a rung, but at least to some extent, so do also the other rings 5, in particular the neighbouring rings 5. For the optimal functioning of the cleaning device it has shown important that the cord 10 is threaded through the rings 5 in correct way. Referring specifically to FIGS. 1*a*, 1*b* and 3 this correct way is as follows. Starting from the bottom attachment 11 at the left-side stringer 3 going upward, the cord 10 threaded through the central hole 6 of each ring 5 entering from the left-hand side and exiting from the right-hand side. The orientation of the rings 5 arranged on the rungs 4 is likewise important for the proper cleaning function. More specifically, the scraper blade 12 is to be located on the exit side of each ring 5, which, still as seen in relation to a cord 10 threaded through from the bottom attachment and upward. So, the cord 10 is threaded through the rings 5 away from the stringer 3 when going upward. Of course if the attachments were associated with the right-hand stringer 3, the arrangement would be a mirror image, but the cord 10 would still be threaded through the rings 5 away from the stringer 3 as seen when going upward.

Turning now to FIG. 1*b*, it can be seen that by grabbing the cord 10 between two rings and pulling (as indicated by the arrow) all rings may be brought into alignment with the attachment devices. If, as illustrated, the attachment devices 11 are attached at or close to one of the stringers 3, preferably on the far side thereof, the pull will move all rings 5 as well as the cord 10 itself to one side of the rungs 4, and provide an unhindered passage for a person to climb the ladder 1. Unlike the prior art devices, the cleaning device and system of the present invention will not obstruct the purpose of the ladder 1, i.e. to be climbed safely. This is in particular the case when as mentioned above, the attachments are on the far side of the ladder 1, i.e. the side facing away from the person climbing the ladder 1.

Figure 2:
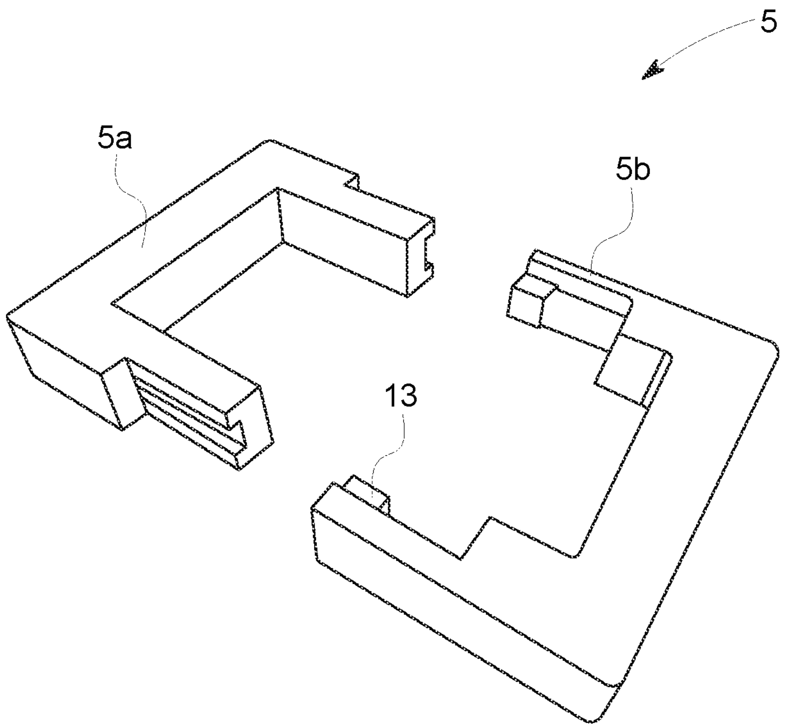
FIG. 2 shows two ring segments for the use in the cleaning device according to the invention, FIG. 3 shown the two ring segments in an installed position around a rung of a ladder and a cord.

The cleaning device of the invention is adapted to be retrofitted to an existing ladder 1 to provide a cleaning system according to the invention, and may thus come as a kit of parts, comprising the cord 10, the suitable number of rings 5 for the length of the cord 10, and the attachment devices 11, fitted on the cord 10 or not. The rings 5 are preferably provided as ring segments 5*a*, 5*b* that may be assembled to rings 5 around the cord 10 and a respective rung 4 without the use of tools. Thus, as can be seen in FIG. 2 a ring 5 may comprise two complementary ring segments 5*a*, 5*b* with mutually interlocking snap acting means, such as protrusions 13 engaging in recesses (not visible) in a well-known manner under the elasticity of the ring segments 5*a*, 5*b*. This inter alia avoids the need for tools for assembling the rings 5 in situ, where conditions may make it difficult to simultaneously hold on to the ladder 1, ring segments 5*a*, 5*b*, the cord 10 and a tool. Removing the tool makes one less thing to consider and thus the installation easier. Irrespective of this, however, the skilled person will understand that the construction of the rings 5 inherently allows them to be placed individually around the rungs 4 independently of each other, e.g. more than one ring 5 around the same rung 4, as well as without the use of the cord 10 linking them together.

The rings 5 may comprise more than the illustrated two segments 5*a*, 5*b*. The ring segments 5*a*, 5*b* are preferably made from a plastic material suitable for the harsh offshore conditions, e.g. by injection moulding. If the plastic material itself does not have the desired buoyancy, buoyancy chambers may be provided inside or outside thereof during manufacture. Inside buoyancy chambers are, however, preferred over outside ones in order not to have unnecessary protrusion on the outside of the rings 5.

With the invention, a simple autonomous cleaning device and system retrofittable on existing ladders is provided. The skilled person will realize that numerous variations and deviation from the above exemplary embodiments in terms of shapes, materials, dimensions are possible without deviating from the inventive idea and the scope of the claims.

The invention claimed is:

1. A ladder cleaning device comprising a plurality of polygonal rings, wherein each of the plurality of rings has a respective central opening and is configured to be assembled around a respective rung of a ladder, wherein each respective central opening is configured so that inner surfaces of the polygonal ring can lie flush with the respective rung of a ladder;

a cord, the cord being threaded through the respective central openings of each of said plurality of rings; and at least one attachment device that is fitted on the cord and is configured to attach said cord to the ladder.

2. The device of claim 1, wherein the at least one attachment device is adapted to attach the cord to a stringer of the ladder.

3. The device of claim 1, wherein the at least one attachment device is adapted to attach the cord to a rung of the ladder.

4. The device of claim 1, comprising two attachment devices arranged at respective ends of the cord, wherein the two attachment devices are separated a predetermined number of rungs apart from each other.

5. The device of claim 1, wherein the at least one attachment device is attached closer to a first stringer of the ladder, and wherein the cord is threaded through the rings such that the cord is closer to the first stringer at a bottom of the ring and further away from the first stringer at a top of the ring.

6. The device of claim 1, wherein the cord is sufficiently long to allow each of the plurality of rings to move horizontally along their respective rungs.

7. The device of claim 1, wherein a profile of the opening is configured to correspond to a cross-sectional shape of the rung.

8. The device of claim 1, wherein a scraper blade is disposed in the opening for engaging the rung.

9. The device of claim 1, wherein a plurality of rigid elongated protrusions are disposed in the opening for engaging the rung.

10. The device of claim 1, wherein each of the plurality of rings is snap-fit together.

11. The device of claim 1, wherein each of the plurality of rings comprises at least two segments, configured to be assembled around a rung to form each ring.

12. The device of claim 11, wherein the at least two segments comprise mutually adapted engaging members to allow tool-less assembly.

13. The device of claim 1, wherein each of the plurality of rings has a lower density than sea water.

14. The device of claim 1, wherein each of the plurality of rings has at least one internal buoyancy chamber.

15. A ladder cleaning device comprising a plurality of polygonal snap-fit rings, wherein each of the plurality of snap-fit rings has a respective central opening and is configured to be arranged around a rung of a ladder, wherein each respective central opening is configured so that inner surfaces of the polygonal ring can lie flush with the rung of a ladder; and a cord, the cord being threaded through the respective openings of each of said plurality of snap-fit rings, thereby transferring movement of one of the plurality of snap-fit rings to other of the plurality of snap-fit rings.

16. The ladder cleaning device of claim 15, further comprising a scraper blade disposed in the opening.

17. The ladder cleaning device of claim 15, wherein at least one attachment device is attached close to a first stringer of the ladder, and wherein the cord is threaded through the plurality of snap-fit rings such that the cord is closer to the first stringer at a bottom of each ring and further away from the first stringer at a top of each ring.

18. A system comprising:

a ladder; and a ladder cleaning device comprising:

a plurality of rings, wherein each of the plurality of rings has an opening configured to be arranged around a rung of a ladder;

a cord passing through the opening of each of said rings; and at least one attachment device adapted for attaching said cord to the ladder, wherein at least one of the plurality of rings is arranged around a rung of the ladder.

19. The system of claim 18, wherein each of the plurality of rings has at least one internal buoyancy chamber.

20. The system of claim 18, wherein each of the plurality of rings snap-fits together.

* * * * *